United States Patent [19]
Kawai et al.

[11] Patent Number: 5,525,856
[45] Date of Patent: Jun. 11, 1996

[54] LIGHT IRRADIATION DEVICE

[75] Inventors: Kouji Kawai; Shigeki Ishihara, both of Hamamatsu, Japan

[73] Assignee: Hamamatsu Photonics K.K., Hamamatsu, Japan

[21] Appl. No.: 506,368

[22] Filed: Jul. 24, 1995

Related U.S. Application Data

[63] Continuation of Ser. No. 92,599, Jul. 16, 1993, abandoned.

[51] Int. Cl.⁶ ..................................................... H01J 61/38
[52] U.S. Cl. ........................ 313/114; 313/112; 313/113; 362/61; 359/839; 359/850; 359/851
[58] Field of Search ..................................... 313/113, 114, 313/112; 359/524, 850, 851, 839, 841, 853; 362/61

[56] References Cited

U.S. PATENT DOCUMENTS

| | | | |
|---|---|---|---|
| 3,835,342 | 9/1974 | Freeman | 313/114 |
| 4,141,060 | 2/1979 | Lacklore et al. | 362/33 |
| 5,029,050 | 7/1991 | Bergkvist | 362/61 |
| 5,130,904 | 7/1992 | Ohshio et al. | 362/61 |
| 5,172,972 | 12/1992 | Terao | 362/66 |
| 5,219,444 | 6/1993 | Chiaramonte et al. | 362/61 |
| 5,228,766 | 7/1993 | Makita et al. | 362/61 |
| 5,251,110 | 10/1993 | LeLeve | 362/61 |
| 5,255,163 | 10/1993 | Neumann | 362/61 |
| 5,295,053 | 3/1994 | Shirai et al. | 362/66 |
| 5,448,453 | 9/1995 | Oshio | 362/61 |

FOREIGN PATENT DOCUMENTS

| | | | |
|---|---|---|---|
| 0465330 | 1/1992 | European Pat. Off. | F21M 3/18 |
| 4108008 | 9/1991 | Germany | F21M 3/02 |
| 4202872 | 8/1993 | Germany | F21M 3/14 |
| 8903778 | 5/1989 | WIPO | B60Q 1/04 |

OTHER PUBLICATIONS

Bergkvist et al, "Safer Nighttime Driving", *Technology Report* 1990, pp. 44–53.
The Photonics Design & Applications Handbook, 1988 Ed. pp. H–316,318, H–56–59.

*Primary Examiner*—Donald J. Yusko
*Assistant Examiner*—Lawrence O. Richardson
*Attorney, Agent, or Firm*—Cushman Darby & Cushman

[57] ABSTRACT

A light irradiation device emits a visible light and an ultraviolet ray by using one light source to reduce an energy cost and simplify a mechanism. A light source 7, a first reflection mirror 8 and a second reflection mirror 9 are provided in a case 6. A radiation light ranging from an ultraviolet area to a visible light area is emitted from the light source 7. The first reflection mirror 8 is a visible light reflection mirror and the second reflection mirror 9 is an ultraviolet ray reflection mirror. Of the light emitted from the light source 7, the visible light is reflected by the first reflection mirror 8 and the ultraviolet ray passes through the first reflection mirror 8 and is reflected by the second reflection mirror 9.

15 Claims, 10 Drawing Sheets

5,525,856

LIGHT IRRADIATION DEVICE

This is a continuation of application Ser. No. 08/092,599, filed on Jul. 16, 1993, which was abandoned upon the filing hereof.

BACKGROUND OF THE INVENTION

1. Field of the Invention

The present invention relates to a light irradiation device for irradiating a visible light and an ultraviolet ray, and more particularly to a light irradiation device suitable for a head lamp of an automobile.

2. Related Background Art

When an ultraviolet light is irradiated to a fluorescent material, the material tends to emit a visible light. Recently, a traffic system which uses such ultraviolet ray (particularly a near-ultraviolet ray (UV-A) of 330–400 nm) to detect a fluorescent material at a distant point has been discussed. FIG. 1 shows an example thereof in which a UV lamp 3 is added to a head lamp 2 of an automobile 1 and a UV (ultraviolet) ray emitted from the UV lamp 3 is irradiated to a pedestrian 4 at a distant point. In this case, if the pedestrian wears a cloth which contains many fluorescent materials such as cotton or nylon, a visible light (fluorescent) is emitted from the cloths when it is irradiated by the UV ray and the ray is caught by eyes of a driver to recognize the pedestrian 4.

The visible light of the head lamp 3 irradiates a relatively near point as shown by a broken line arrow in FIG. 1 in order to prevent the light from affecting to a facing car, and a limit of the irradiation distance is 40–50 meters. On the other hand, since the near ultraviolet ray does not affect to the facing car and is harmless to a human body, it may be emitted parallelly to the ground so that a pedestrian of 150 meters ahead can be recognize.

By the combination of the visible light and the ultraviolet ray, it is possible to construct a safer traffic system. In a prior art light irradiation device of this type, however, it is usual to separately arrange a light source for generating the visible light and a light source for generating the ultraviolet ray. However, the use of the two light sources is waste of energy and the construction of the device is complicated.

SUMMARY OF THE INVENTION

It is an object of the present invention to provide a light irradiation device which solves the above problems by emitting the visible light and the ultraviolet light by sharing one light source.

In order to achieve the above object, the light irradiation device of the present invention comprises a light source for generating a radiation light ranging from an ultraviolet area to a visible light area, a first reflection mirror for reflecting the visible light of the light from the light source in a first direction, and a second reflection mirror for reflecting the ultraviolet ray of the light from the light source in a second direction.

The radiation light emitted from the light source is separated to the ultraviolet ray and the visible light by a ultraviolet ray reflection mirror and a visible light reflection mirror, and the directions of the irradiation of the ultraviolet ray and the visible light are separately controlled by the reflection mirrors.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DETAILED DESCRIPTION OF THE PREFERRED EMBODIMENTS

Figure 1:
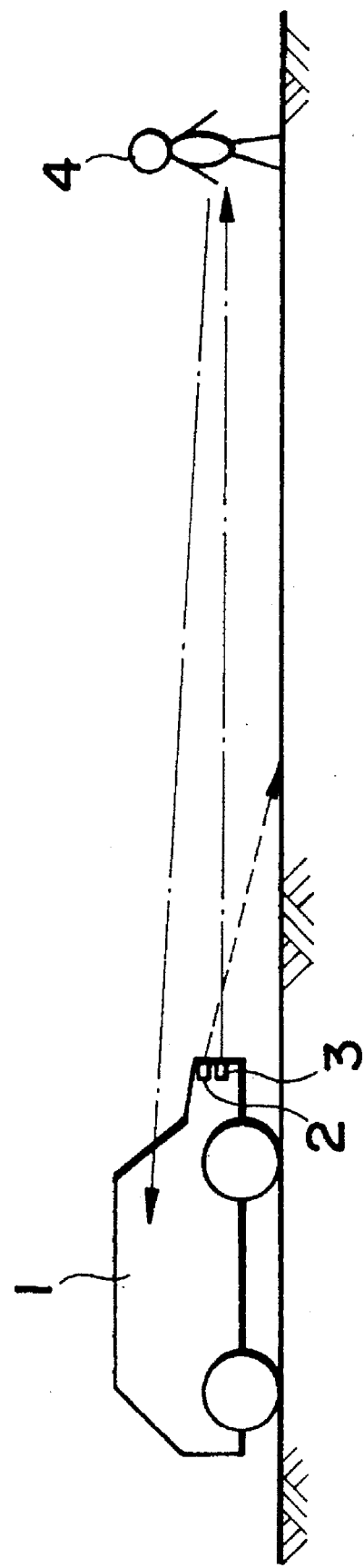
FIG. 1 shows an irradiation system of an automobile which irradiates a visible light and a ultraviolet ray forwardly.
Figure 2:
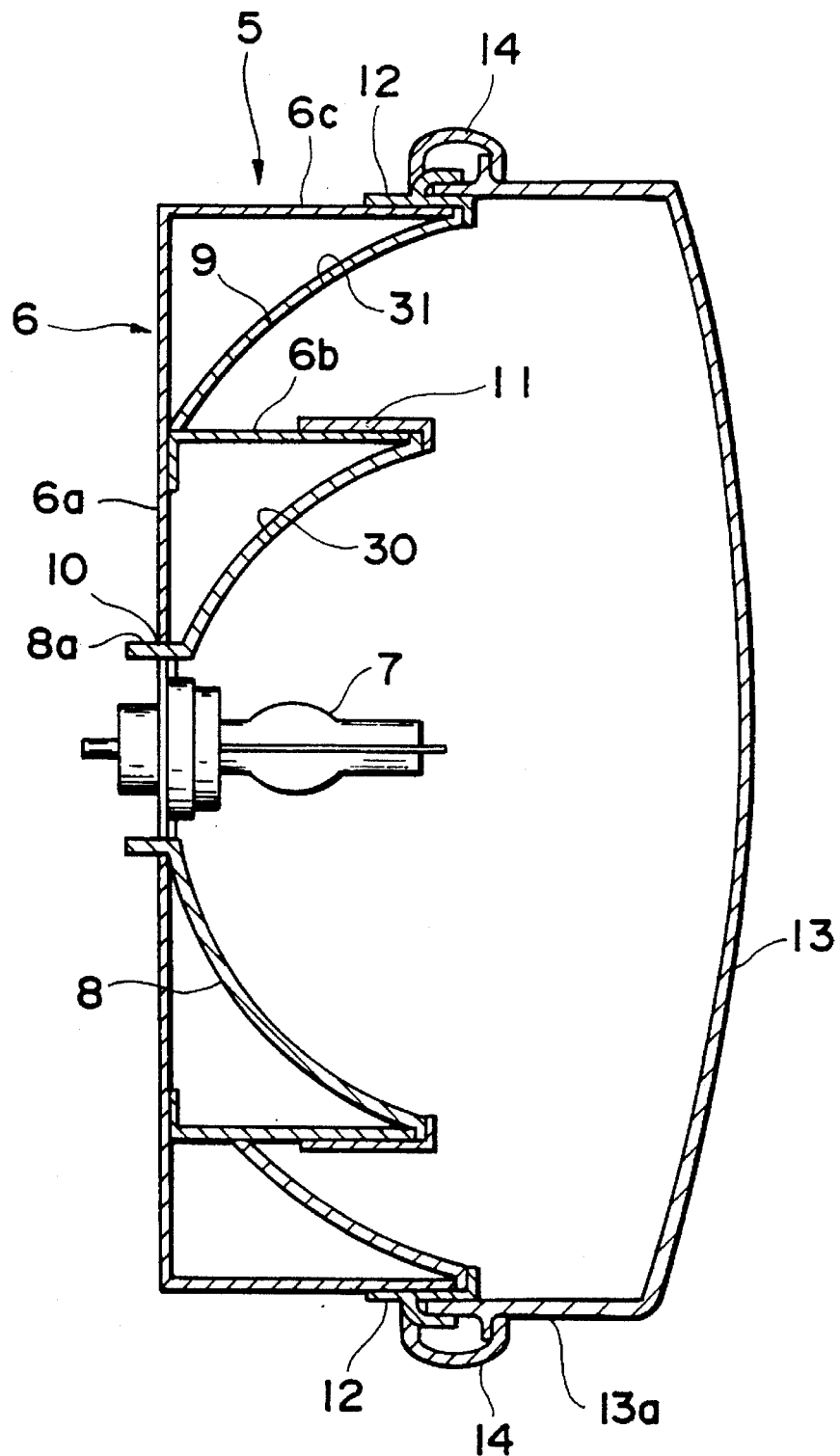
FIG. 2 shows a longitudinal sectional side view of a first embodiment of the light irradiation device of the present invention.
Figure 3:
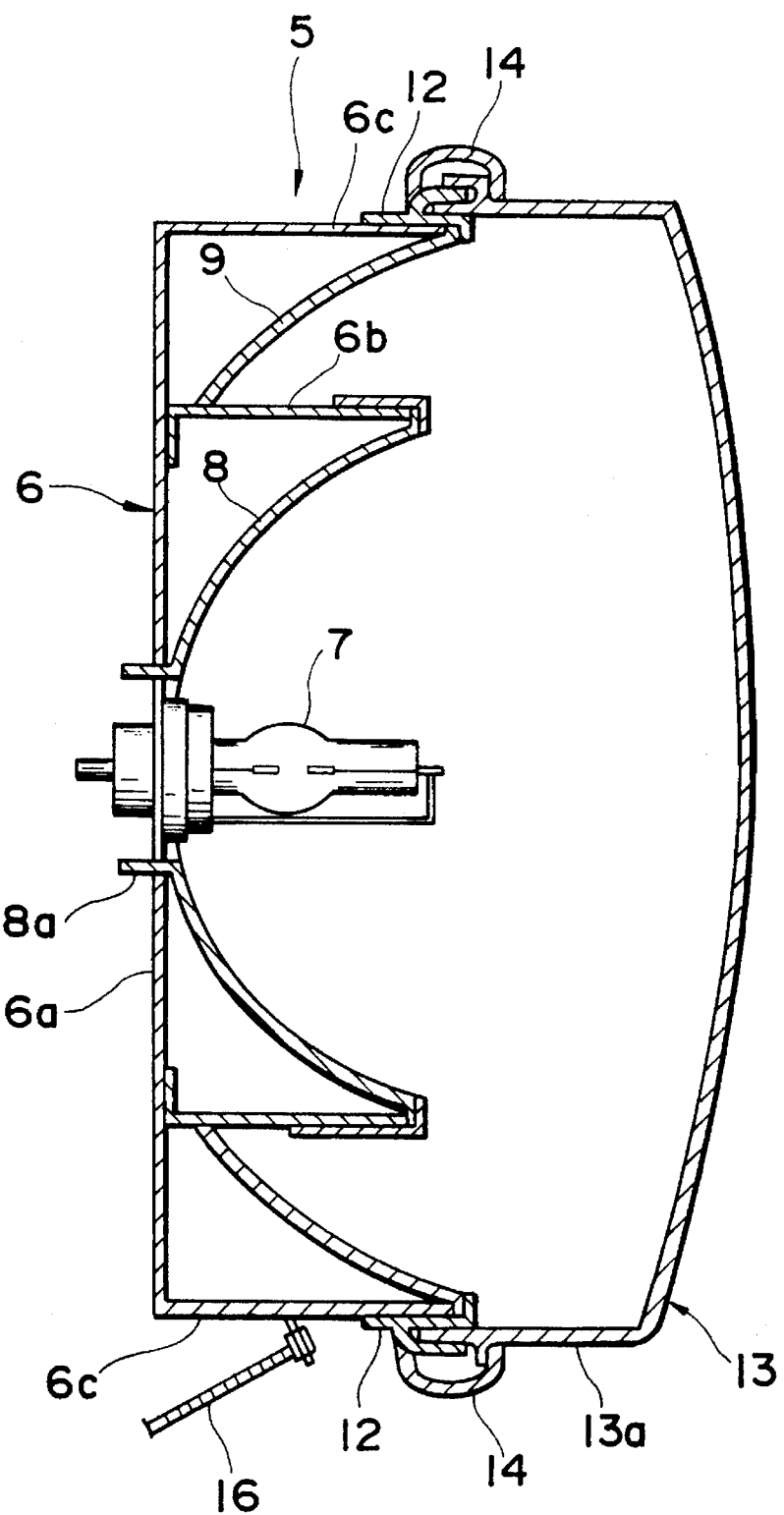
FIG. 3 shows a cross sectional view thereof.
Figure 4:
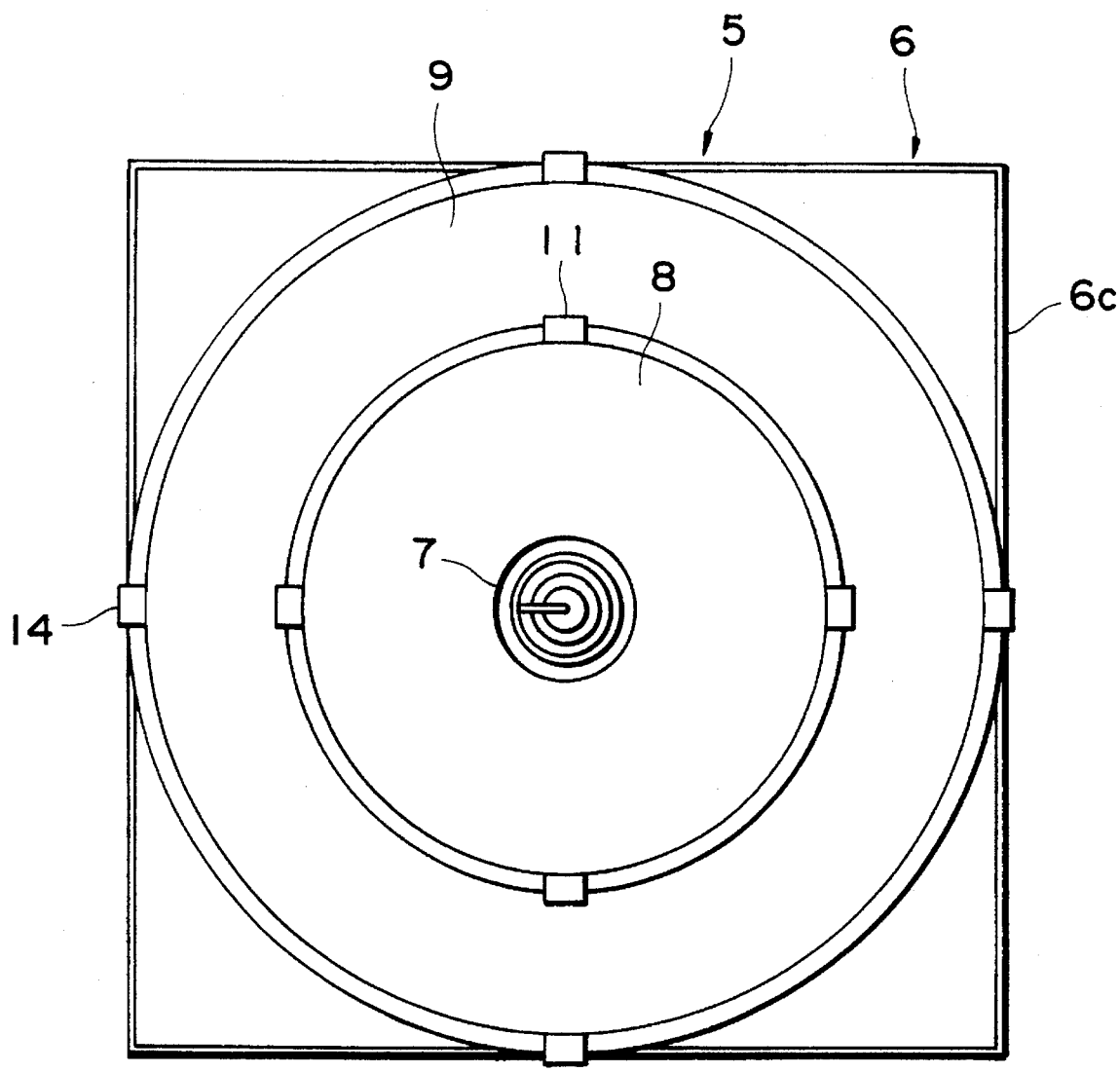
FIG. 4 shows a front view thereof.
Figure 5:
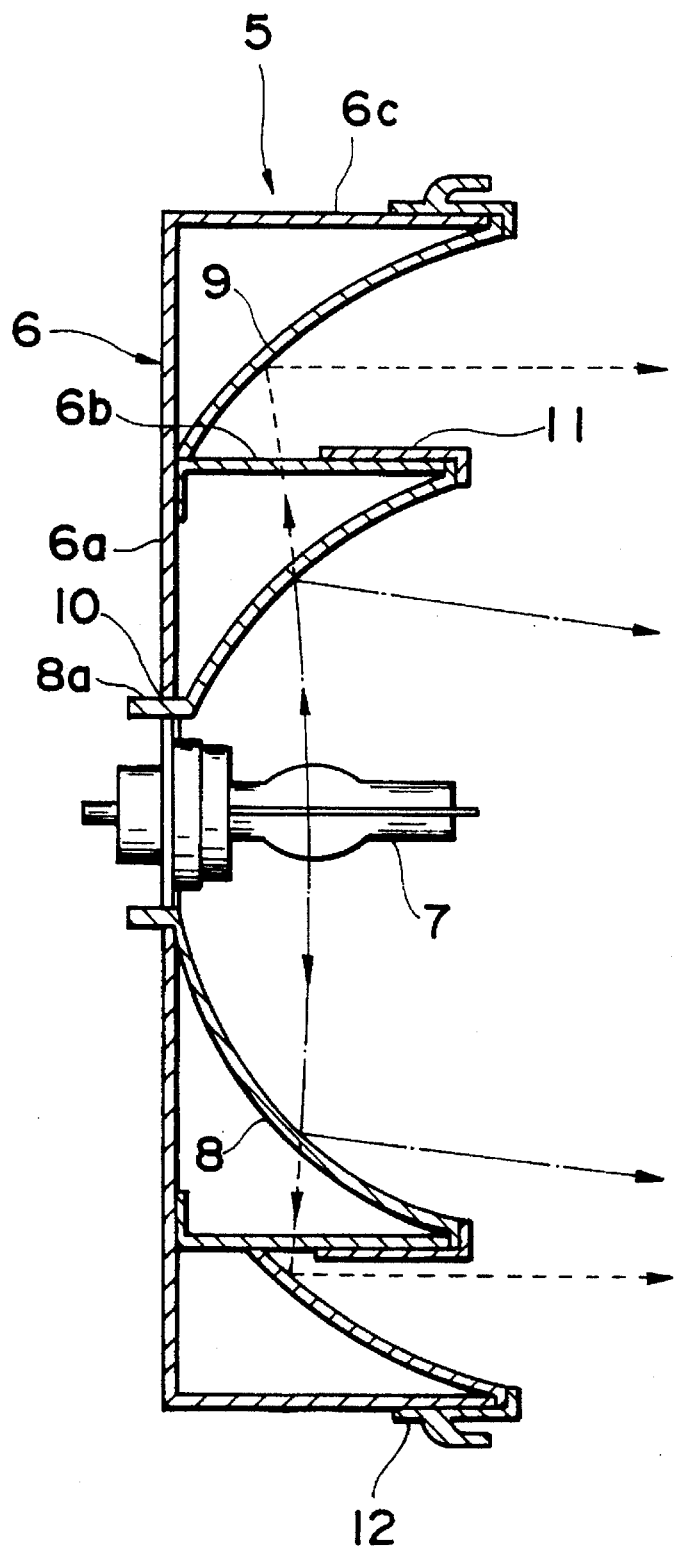
FIG. 5 shows a longitudinal sectional side view indicating directions of reflection of the visible light and the ultraviolet ray, in which a front glass is omitted.

A first embodiment of the present invention is now explained with reference to FIGS. 2–7.

In the present light irradiation device 5, a light source 7 is arranged at a center of a rear plate 6a of case 6 formed by bending a conductive metal plate, and a first reflection mirror 8 and a second reflection mirror 9 are provided in an inside of the case 6 and an outside of the light source 7 to surround the light source 7. A discharge tube which emits a radiation light ranging from an ultraviolet ray area to an infrared area is used as the light source 7. The discharge lamp may be a high voltage discharge tube such as metal halide lamp, xenon lamp, mercury xenon lamp, mercury lamp or natrium lamp. Alternatively, the light source 7 may be a lamp having a filament such as halogen lamp or incandescence lamp.

The first reflection mirror 8 has a bowl-shaped body and a bottom which has an aperture and a cylinder shape. The light source 7 is held at a cylinder portion 8a of the first reflection mirror 8 and the cylinder portion 8a is inserted into and fixed to an opening 10 formed in the rear plate 6a.

An outer periphery of the first reflection mirror 8 is secured to four support members 6b of the case 6 by four fixing members 11. The first reflection mirror 8 is a visible light reflection mirror which reflects forward only the visible light (wavelength 380–800 nm) of the radiation light emitted from the light source 7 and passed the ultraviolet ray. In order to achieve the above function, the first reflection mirror 8 has a visible light reflection film layer 30 formed on a front surface of a bowl-shaped transparent member such as glass which is transparent to a light ranging from an ultraviolet area to a visible light area. The visible light reflection film layer 30 is formed by adjusting the number of films of a multi-layer film made of dichroic coating ($T^iO_2$—$S^iO_2$).

Figures 6, 7:
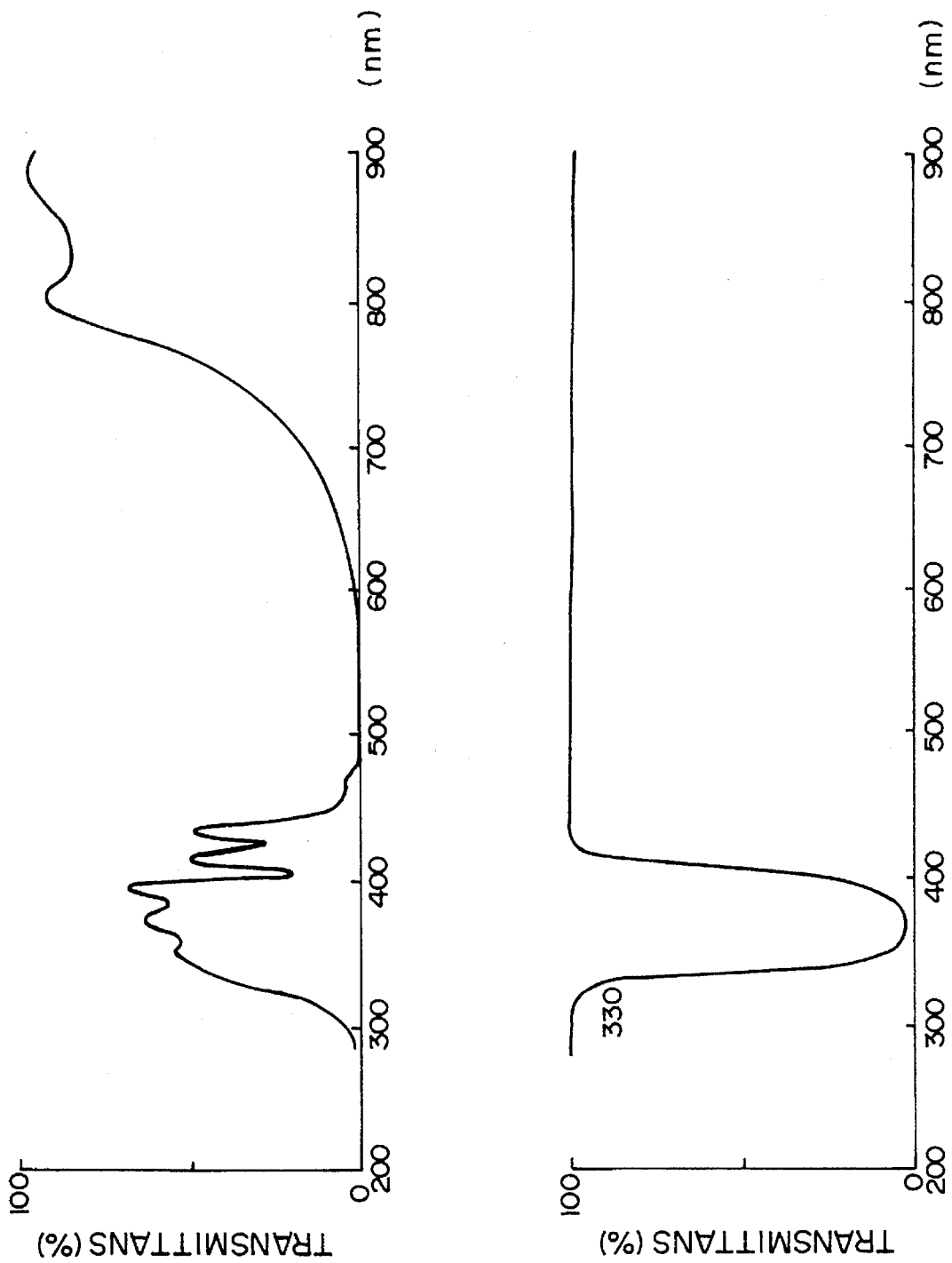
FIG. 6 shows a transmission wavelength characteristic of a first reflection mirror (a visible light reflection mirror) 8.
FIG. 7 shows a transmission wavelength characteristic of a second reflection mirror (an ultraviolet ray reflection mirror) 9.

A transmission wavelength characteristic of the first reflection mirror 8 is shown in FIG. 6 in which an abscissa represents a wavelength and an ordinate represents a transmission. As seen from the characteristic chart, the first reflection mirror 8 mainly reflects a visible light in the wavelength range of 500–750 nm and transmits a near ultraviolet ray (UV-A ray) around the wavelength of 300–400 nm.

The second reflection mirror 9 has a bowl shape having a larger outer periphery than that of the first reflection mirror 8. An opening which is large enough to permit the insertion of the four internal support members 6b thereinto is formed in the bottom of the second reflection mirror 9. The second reflection mirror 9 is arranged to externally surround the first reflection mirror 8. The opening edge or the inner periphery of the second reflection mirror 9 abuts against outer walls of the four internal support members 6b of the case 6, and an outer periphery thereof is fixed to an external support frame 6c by four fixing members 12. The second reflection mirror 9 serves to reflect forward the ultraviolet ray transmitted through the first reflection mirror 8. In the second reflection mirror 9, an ultraviolet ray reflection film layer 31 is formed on a front surface of a transparent or opaque bowl-shaped body by the adjustment of the number of films of a multi-layer film made of dichroic coat ($T^iO_2$—$S^iO_2$).

FIG. 7 shows a transmission wavelength characteristic of the second reflection mirror 9. It is seen form FIG. 7 that the second reflection mirror 9 selectively reflects a near ultraviolet ray having wavelength 330–400 nm.

A front glass 13 which transmits the ultraviolet ray and the visible light is arrange in front of the case 6 and both edges 13a of the front glass 13 are fixed to the fixing member 12 by a clamp 14. The case 6 is grounded to a car body (not shown) on which the present light irradiation device is mounted, through a conductor 16.

In the first embodiment of the light irradiation device 5, the first reflection mirror 8 and the second reflection mirror 9 have different reflection angles to each other. Of the radiation light ranging from the ultraviolet area to the visible light emitted from the light source 7, the visible light is reflected by the first reflection mirror 8 as shown by an alternate long and short dash line arrow in FIG. 5 and radiated at a small angle to the direction normal to the rear plate 6a, that is, slightly downward. The ultraviolet ray passes through the first reflection mirror 8 and is radiated substantially normally to the rear plate 6a by the second reflection mirror 9 as shown by a broken line arrow. In this manner, by the combination of the first reflection mirror 8 and the second reflection mirror 9, the visible light emitted from one light source 7 is separated to the visible light and the ultraviolet ray, which are radiated to the desired directions, respectively.

In the first embodiment, the first reflection mirror 8 is the visible light reflection mirror and the second reflection mirror 9 is the ultraviolet ray reflection mirror although it is not restrictive. For example, the first reflection mirror 8 may be the ultraviolet ray reflection mirror and the second reflection mirror 9 may be the visible light reflective mirror. In this case, the directions of reflection of the reflection mirrors must be adjusted depending on the object.

The front glass 13 may be a lens which passes the ultraviolet ray and the visible light over the entire surface, and portion through which the light emitted from the ultraviolet ray reflection mirror passes maybe an ultraviolet ray pass lens and a portion through which the light emitted from the visible light reflection mirror passes may be a visible light pass lens.

A second embodiment of the light irradiation device of the present invention is now explained with reference to FIGS. 8 to 10. Those elements which are identical to those of the first embodiment are designated by the same numerals.

In the first embodiment, a double structure reflection mirror in which the bowl-shaped first reflection mirror 8 is surrounded by the second reflection mirror 9 of a larger bowl-shape is used.

In the second embodiment, the reflection area is vertically divided into two parts which are assigned to the visible light and the ultraviolet ray, respectively. Namely, an upper reflection mirror 17a and a lower reflection mirror 17b are provided and they have a half-bowl shape. The reflection mirrors 17a and 17b are made unitary through a delimiting member 17c to form a full bowl-shaped reflection mirror.

The upper reflection mirror 17a is a visible light reflection mirror and the lower reflection mirror 17b is an ultraviolet ray reflection mirror. In the second embodiment, of the radiation light ranging from the ultraviolet area to the visible light area emitted from the light source 7, the visible light is reflected by the upper reflection mirror 17a and radiated slightly downward to irradiate a relatively near object as shown by an alternate long and short dash line arrow in FIG. 8, and the ultraviolet light is reflected substantially horizontally by the lower reflection mirror 17b as shown by a broken line arrow in FIG. 8 and radiated farther than the visible light. In the second embodiment, the visible light reflection mirror and the ultraviolet ray reflection mirror are constructed by the upper reflection mirror 17a and the lower reflection mirror 17b, respectively, although the relation thereof may be reversed. Namely, the visible light reflection mirror may be constructed by the lower reflection mirror 17b and the ultraviolet ray reflection mirror may be constructed by the upper reflection mirror 17a. In this case, since the radiation direction of the visible light and the radiation direction of the ultraviolet ray are exchanged, the radiation angles should be appropriately adjusted.

Furthermore, one reflection mirror 17 may be laterally symmetrically divided into two parts by a vertically extending delimiting line and one of them may be used as the visible light reflection mirror and the other may be used as the ultraviolet ray reflection mirror ( not shown ).

Figure 11:
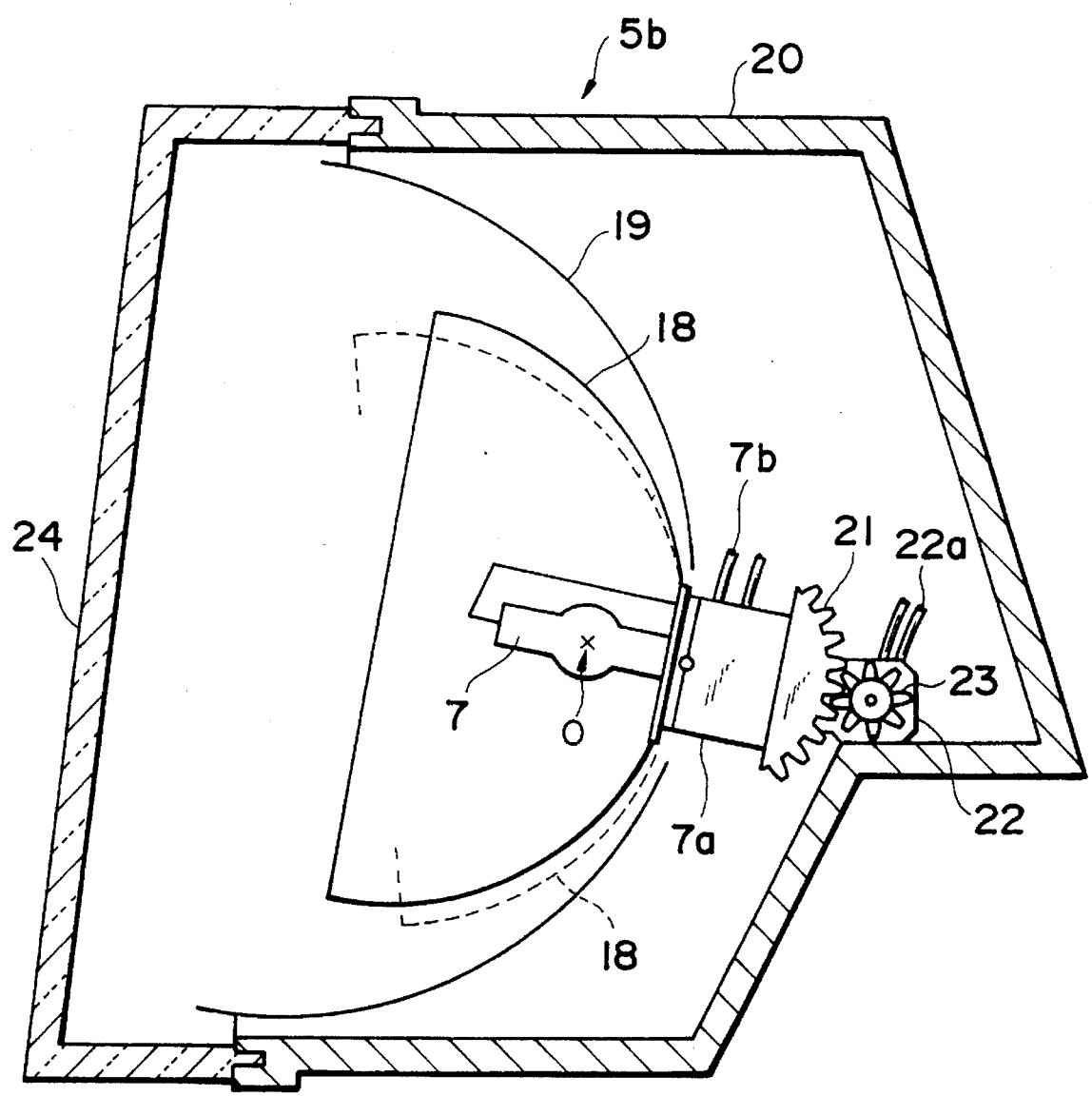

A light irradiation device in a third embodiment of the present invention is now explained with reference to FIG. 11. The present light irradiation device 5b is similar to the first embodiment in that it has a double reflection mirror structure in which the ultraviolet ray reflection mirror is arrange externally of the visible light reflection mirror, and it differs from the first embodiment in that the reflection light radiation angle of the inner visible light reflection mirror is variable. Namely, in the third embodiment, a first reflection mirror 18 which is the visible light reflection mirror is rotatable and a second reflection mirror is fixed to a case 20.

The light source 7 is provided at the center of the first reflection mirror 18.

More specifically, a sector-shaped drive gear 21 is provided at a rear of a holding member 7a of the light source 7 which is a discharge tube, and a pinion 23 of a drive motor 22 meshes with the drive gear 21.

A support shaft (not shown) which is parallel to a rotation shaft of the drive motor 22 and essentially overlaps with a line extending through a center 0 of an arc of the discharge tube is provided at the first reflection mirror 18, and the support shaft is rotatably supported by the case 20. When the drive motor 22 is energized, the first reflection mirror 18 is rotated in a range between a solid line and a broken line in FIG. 11 to vary the irradiation range of the visible light. Since the center 0 of the light source 7 is a support point, the light source 7 is merely slightly rotated at the same position even if the first reflection mirror 18 is rotated, and an affect to the reflection of the second reflection mirror 19 is little and the radiation direction of the ultraviolet ray does not significantly change. The position of the support point may be varied depending on the application. A lamp input cable 7b extends from the holding member 7a of the light source 7 and a motor drive cable 22a extends from the drive motor 22. A front glass 24 is provided in the case 20.

In the third embodiment, the irradiation range may be varied as required by changing the angle of the first reflection mirror 18 which is the visible light reflection mirror while the second reflection mirror 19 which is the ultraviolet ray reflection mirror is fixed. Alternatively, the first reflection mirror 18 may be the ultraviolet ray reflection mirror and the second reflection mirror 19 may be the visible light reflection mirror. In the third embodiment, the inner first reflection mirror 18 is rotatable. Alternatively, it may be a fixed reflection mirror and the second reflection mirror 19 may be rotatable. Further, both inner and outer reflection mirrors may be rotatable.

In the third embodiment, one or both of the reflection mirrors of the double reflection structure shown in the first embodiment are rotatable. Alternatively, one or both of the reflection mirrors of the two-division reflection mirror structure shown in the second embodiment may be rotatable and it is within the scope of the present invention.

Figure 8:
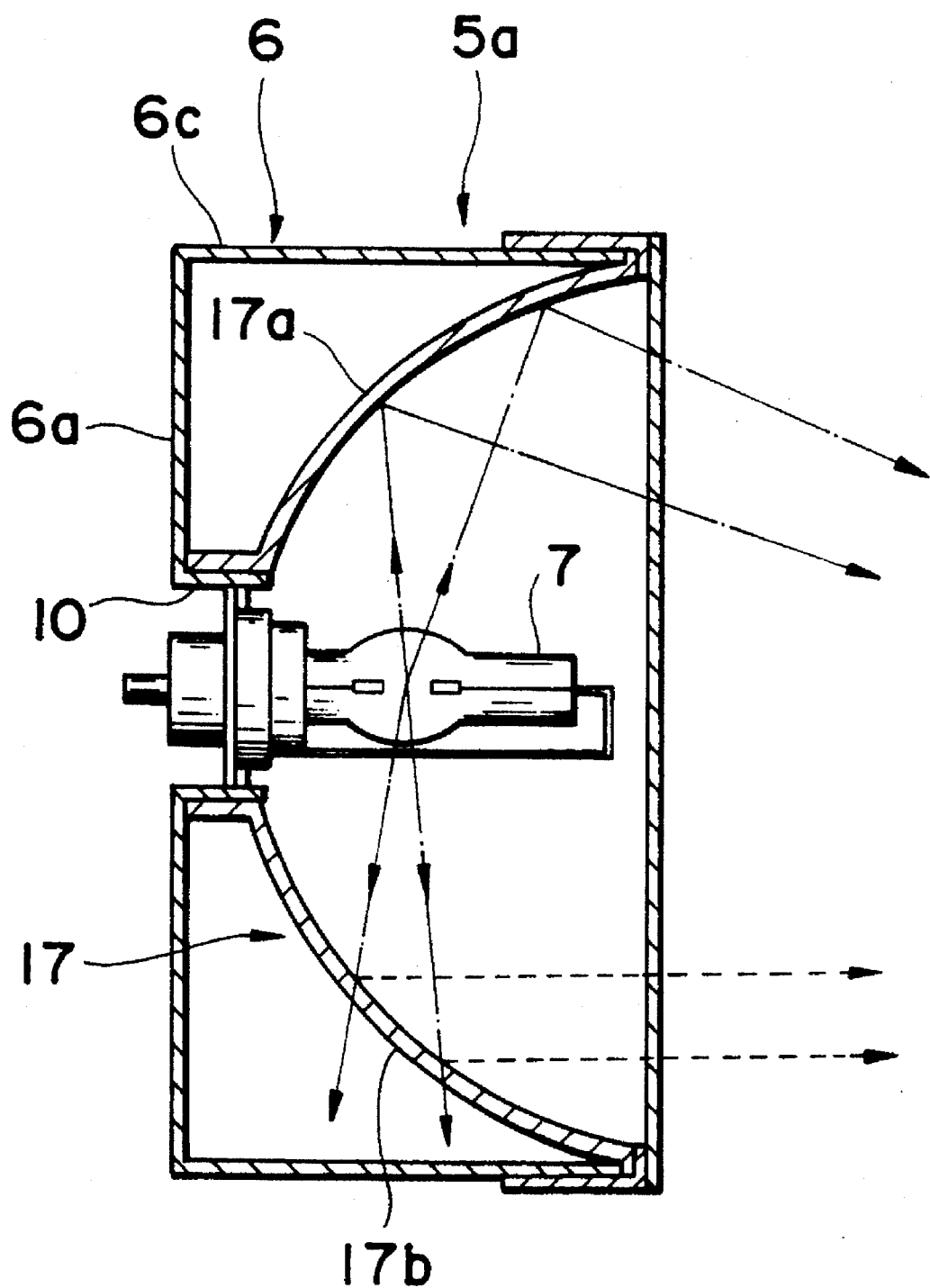
FIG. 8 shows a longitudinal sectional side view of a second embodiment of the light irradiation device of the present invention.
Figure 9:
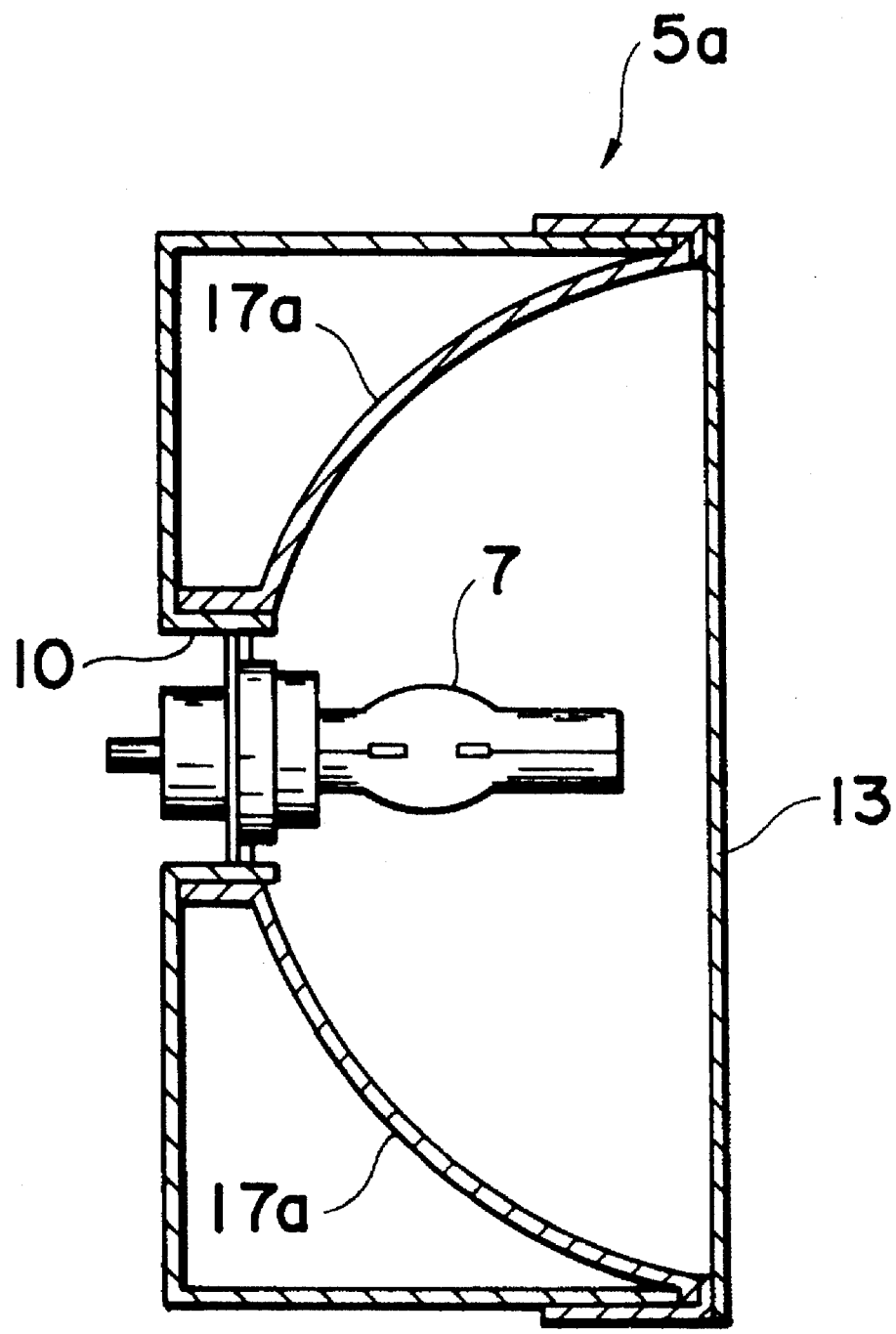
FIG. 9 shows a cross sectional view thereof.
Figure 10:
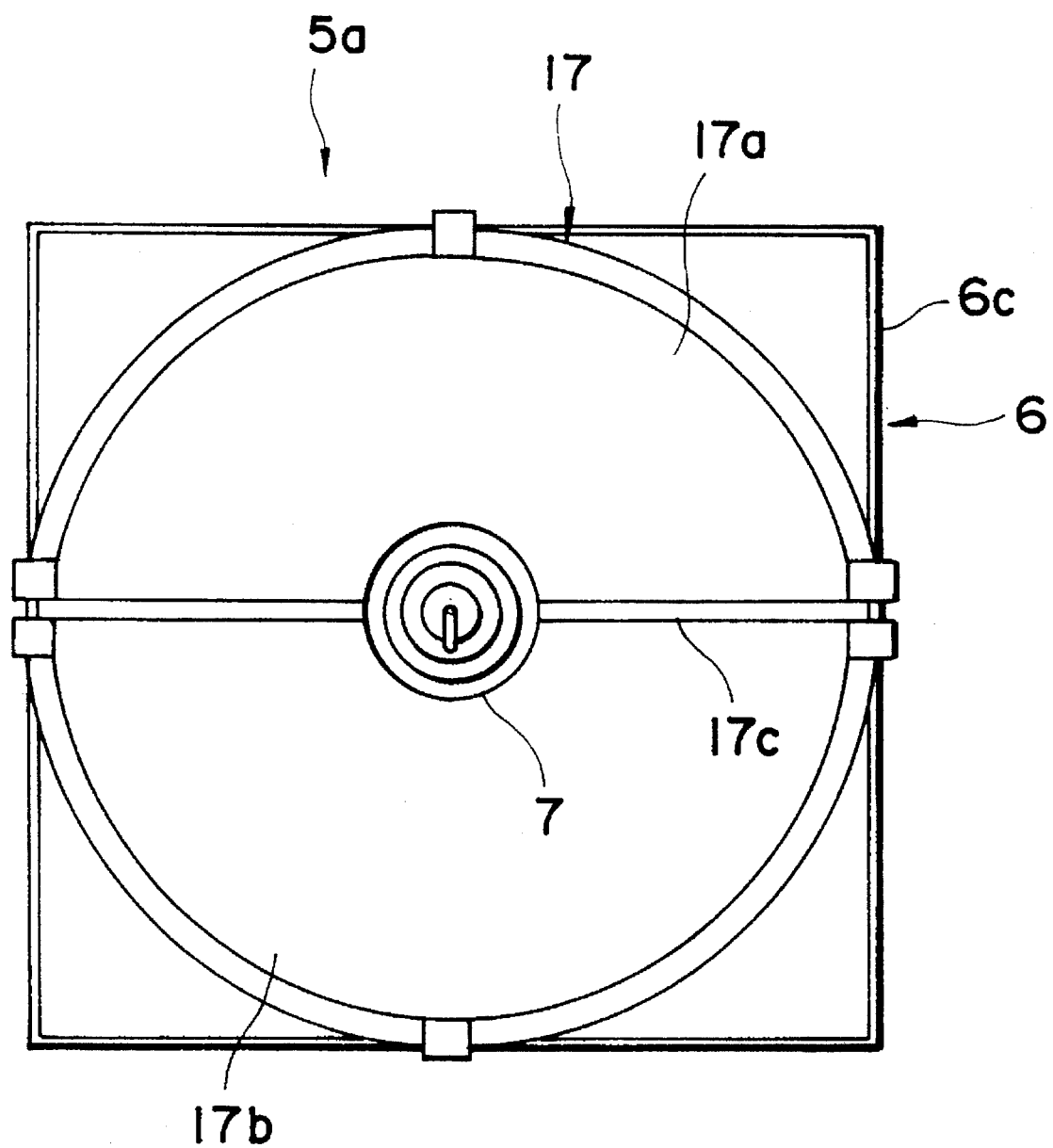
FIG. 10 shows a front view thereof and, FIG. 11 shows a longitudinal sectional side view of a third embodiment of the light irradiation device of the present invention.

Namely, in the light irradiation device of FIG. 8 to 10, a support shaft may be provided at one or both of the upper reflection mirror 17a and the lower reflection mirror 17b in the vicinity of the edge beside the delimiting member 17c and the reflection mirrors may be rotated around the support shaft (not shown).

In the third embodiment, the reflection mirrors are electrically driven although it is not restrictive and an oil pressure drive system, for example, may be used.

The above embodiments are designed for use in the head lamp of the automobile although the light irradiation device of the present invention may be used for other than head lamp of the automobile.

In accordance with the present invention, the light emitted from the light source is separated to the visible light and the ultraviolet ray by the combination of the visible light reflection mirror and the ultraviolet ray reflection mirror so that the radiation direction is varied for each reflection mirror. Accordingly, it is effective in terms of energy consumption, the construction of the light irradiation device is simplified and the mass-productivity is improved.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A light irradiation device comprising:

a light source for emitting visible light and ultraviolet light;

a first reflector provided to at least partially surround said light source, for reflecting at least visible light incident from said light source, said first reflector reflecting said incident visible light in a first direction, said first reflector including:

a first main body consisting of a material through which ultraviolet light passes; and a first reflection film disposed on a main surface of said first main body facing said light source, said first reflection film selectively reflecting said incident visible light; and a second reflector provided outside of said first reflector for reflecting incident ultraviolet light which has passed through said first reflector, said second reflector reflecting said incident ultraviolet light in a second direction, said second reflector including:

a second main body; and a second reflection film disposed on a main surface of said second main body, said second reflection film selectively reflecting said ultraviolet light.

2. A light irradiation device according to claim 1, said first reflector and said second reflector are housed in one case.

3. A light irradiation device according to claim 1, wherein said first direction and said second direction are different.

4. A light irradiation device according to claim 3, wherein an acute angle is formed between said first direction and said second direction.

5. A light irradiation device according to claim 1, wherein said light source is one of a metal halide lamp, xenon lamp, mercury xenon lamp, mercury lamp, natrium lamp, halogen lamp and incandescent lamp.

6. A light irradiation device according to claim 1, wherein said first reflector is fixed to a portion of said light source, and said second reflector has an opening, said portion of said light source being located external to said second reflector.

7. A light irradiation device comprising:

a light source for emitting visible light and ultraviolet light;

a first reflector at least partially surrounding said light source for selectively reflecting ultraviolet light incident from said light source, said first reflector reflecting said incident ultraviolet light in a first direction, said first reflector including:

a first main body consisting of a material through which visible light passes; and a first reflection film disposed on a main surface of said first main body facing said light source, said first reflection film selectively reflecting said incident ultraviolet light; and a second reflector provided external to said first reflector for reflecting at least incident visible light which has passed through said first reflector from said light source, said second reflector reflecting said incident visible light in a second direction, said second reflector including:

a second main body; and a second reflection film disposed on a main surface of said second main body, said second reflection film reflecting at least said incident visible light.

8. A light irradiation device according to claim 7 wherein said second main body of said second reflector consists of a material through which said visible light passes.

9. A light irradiation device according to claim 7, wherein said first reflector and said second reflector are housed in one case.

10. A light irradiation device according to claim 7, wherein said first direction and said second direction are different.

11. A light irradiation device according to claim 10, wherein an acute angle is formed between said first direction and said second direction.

12. An irradiation device according to claim 7, wherein said light source is one of a metal halide lamp, xenon lamp, mercury xenon lamp, mercury lamp, natrium lamp, halogen lamp and incandescent lamp.

13. A light irradiation device according to claim 7, wherein said first reflector is fixed to a portion of said light source, and said second reflector has an opening, said portion of said light source being located external to said second reflector.

14. A light irradiation device comprising:

a light source for emitting visible light and ultraviolet light;

a first reflector fixed to a portion of said light source and positioned to at least partially surround said light source, said first reflector reflecting in a first direction at least visible light incident from said light source, said first reflector including:
 a first main body consisting of a material through which ultraviolet light passes; and
 a first reflection film disposed on a main surface of said first main body facing said light source, said first reflection film selectively reflecting said incident visible light;

a second reflector provided outside of said first reflector for reflecting incident ultraviolet light which has passed through said first reflector, said second reflector reflecting said incident ultraviolet light in a second direction and having an opening for introducing said portion of said light source into an exterior of said second reflector, said second reflector including:
 a second main body; and
 a second reflecting film disposed on a main surface of said second main body for selectively reflecting said ultraviolet light; and control means provided external to said second reflector and supporting said portion of said light source, whereby said control means controls said first direction of said reflected visible light by moving said entire first reflector.

15. A light irradiation device comprising:

light source for emitting visible light and ultraviolet light;

a first reflector at least partially surrounding said light source for selectively reflecting ultraviolet light incident from said light source, said first reflector reflecting said incident ultraviolet light in a first direction and being fixed to a portion of said light source, said first reflector including:
 a first main body consisting of a material through which visible light passes; and
 a first reflection film disposed on a main surface of said first main body facing said light source, said first reflection film selectively reflecting said incident ultraviolet light;

a second reflector provided external to said first reflector for reflecting at least incident visible light which has passed through said first reflector from said light source, said second reflector reflecting said incident visible light in second direction and having an opening for introducing said portion of said light source into an exterior of said second reflector, said second reflector including:
 a second main body; and
 a second reflection film disposed on a main surface of said second main body for reflecting at least said incident visible light; and control means provided external to said second reflector and supporting said portion of said light source, whereby said control means controls said first direction of said reflected ultraviolet light by moving said entire first reflector.

\* \* \* \* \*